United States Patent
Kim et al.

(10) Patent No.: US 10,966,095 B2
(45) Date of Patent: Mar. 30, 2021

(54) VEHICLE NETWORK INTRUSION DETECTION DEVICE, SYSTEM INCLUDING THE SAME, AND METHOD THEREOF

(71) Applicants: HYUNDAI MOTOR COMPANY, Seoul (KR); KIA MOTORS CORPORATION, Seoul (KR); Korea University Research and Business Foundation, Seoul (KR)

(72) Inventors: Se Il Kim, Seongnam-si (KR); Tae Guen Kim, Suwon-si (KR); Dong Hoon Lee, Seoul (KR); Won Suk Choi, Seoul (KR); Kyung Ho Joo, Seoul (KR)

(73) Assignees: HYUNDAI MOTOR COMPANY, Seoul (KR); KIA MOTORS CORPORATION, Seoul (KR); KOREA UNIVERSITY RESEARCH AND BUSINESS FOUNDATION, Seoul (KR)

(*) Notice: Subject to any disclaimer, the term of this patent is extended or adjusted under 35 U.S.C. 154(b) by 0 days.

(21) Appl. No.: 16/693,721

(22) Filed: Nov. 25, 2019

(65) Prior Publication Data

US 2021/0067971 A1   Mar. 4, 2021

(30) Foreign Application Priority Data

Aug. 29, 2019 (KR) .................. 10-2019-0106756

(51) Int. Cl.
*H04W 12/121* (2021.01)
*H04W 4/48* (2018.01)
(Continued)

(52) U.S. Cl.
CPC .......... *H04W 12/121* (2021.01); *H04L 12/40* (2013.01); *H04W 4/48* (2018.02); *G06F 17/18* (2013.01);
(Continued)

(58) Field of Classification Search
None
See application file for complete search history.

(56) References Cited

U.S. PATENT DOCUMENTS 7,203,962 B1 * 4/2007 Moran .................... G06F 21/52
                                                    726/23
8,578,490 B2 * 11/2013 Moran .................. G06F 21/552
                                                    726/23

(Continued)

FOREIGN PATENT DOCUMENTS

KR    10-1669946 B1    10/2016
KR    10-1843930 B1    4/2018

OTHER PUBLICATIONS

Ptacek, Thomas H. and Newsham, Timothy N., "Insertion, Evasion, and Denial of Service: Eluding Network intrusion Detection," Jan. 1998, Secure Netdworks, Inc.. pp. 1-63.*

*Primary Examiner* — John F Mortell
(74) *Attorney, Agent, or Firm* — Brinks Gilson & Lione (57) ABSTRACT

A vehicle network intrusion detection device, a system including the same, and a method thereof are provided. The vehicle network intrusion detection device includes a processor that records a receive timestamp of a controller area network (CAN) message for each CAN ID, calculates a residual, which is a difference between a real receive timestamp and an average receive timestamp of the CAN message, using the recorded receive timestamp, and determines whether there is a vehicle network intrusion based on the residual and a storage storing at least one of the CAN
(Continued)

message receive timestamp, the residual, or the result of detecting the intrusion.

20 Claims, 9 Drawing Sheets

(51) Int. Cl.
  *G06F 17/18* (2006.01)
  *H04L 12/40* (2006.01)
(52) U.S. Cl.
  CPC .............. *H04L 2012/40215* (2013.01); *H04L 2012/40273* (2013.01)

(56) References Cited

U.S. PATENT DOCUMENTS

| | | | | |
|---|---|---|---|---|
| 2016/0188396 | A1* | 6/2016 | Sonalker | H04L 63/1425 714/37 |
| 2017/0286675 | A1* | 10/2017 | Shin | G06F 1/12 |
| 2018/0337934 | A1* | 11/2018 | Huth | H04W 4/48 |

* cited by examiner

VEHICLE NETWORK INTRUSION DETECTION DEVICE, SYSTEM INCLUDING THE SAME, AND METHOD THEREOF

CROSS-REFERENCE TO RELATED APPLICATION

This application claims priority to and the benefit of Korean Patent Application No. 10-2019-0106756, filed on Aug. 29, 2019, the entire contents of which are incorporated herein by reference.

FIELD

The present disclosure relates to a vehicle network intrusion detection device, a system including the same, and a method thereof, and more particularly, relates to technologies of detecting an intrusion into a controller area network (CAN) communication network of a vehicle.

BACKGROUND

The statements in this section merely provide background information related to the present disclosure and may not constitute prior art.

Today, there has been a huge increase in the proportion of an electronic control unit (ECU) loaded into the vehicle, and it has been possible to access a network over a wireless network in the vehicle.

As such, as the vehicle is connected to wireless communication and a surrounding network environment, a vehicle attack which has an influence on the ECU is possible over a network from the outside. Vehicle malfunction due to an external attack causes the vehicle and passengers to have fatal consequences.

However, vehicles which are currently mass-produced take little account of protection means for it and do not have sufficient protection means. Research and development of an intrusion detection system for vehicle protection is still in its beginning stages. Technologies for several intrusion detection systems are proposed, but, because their algorithms are complex and because there is a huge amount of computation therein, it is unable to still apply and use the proposed technologies to the vehicle because it is unable to implement the proposed technologies in a vehicle system.

SUMMARY

The present disclosure addresses the above-mentioned problems occurring in the prior art while advantages achieved by the prior art are maintained intact.

An aspect of the present disclosure provides a vehicle network intrusion detection device for effectively detecting an intrusion into a CAN communication network of a vehicle by updating software of a device in the vehicle, a system including the same, and a method thereof.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a vehicle network intrusion detection device may include: a processor that records a receive timestamp of a controller area network (CAN) message for each CAN ID, calculates a residual, which is a difference between a real receive timestamp and an average receive timestamp of the CAN message, using the recorded receive timestamp, and determines whether there is a vehicle network intrusion based on the residual and a storage storing at least one of the CAN message receive timestamp, the residual, or the result of detecting the vehicle network intrusion, which are obtained by the processor.

In an embodiment, the processor may calculate the residual based on a message receive time interval and an average time interval in a normal state. In particular, the message receive time interval is defined as a difference between a receive timestamp of a CAN message which is received immediately before and a receive timestamp of a CAN message which is currently received.

In an embodiment, the processor may calculate a cumulative residual by accumulating and updating a residual calculated for each CAN ID.

In an embodiment, the processor may calculate a differentiated cumulative residual by differentiating the cumulative residual when there are one or more of received CAN messages.

In an embodiment, the processor may calculate an upper threshold and a lower threshold using an average value and a standard deviation of differentiated cumulative residuals calculated in a normal state.

In an embodiment, the processor may determine that the vehicle network intrusion is detected, when the differentiated cumulative residual is greater than the upper threshold or is less than the lower threshold.

In an embodiment, the processor may determine that the vehicle network intrusion is detected, when the residual departs from a threshold range.

In an embodiment, the vehicle network intrusion detection device may further include a communicator that receives or transmits a CAN message through a CAN bus.

According to another aspect of the present disclosure, a vehicle system may include: a vehicle network intrusion detection device that records a receive timestamp of a CAN message for each CAN ID, calculates a residual, which is a difference between a real receive timestamp and an average receive timestamp of the CAN message, using the recorded receive timestamp, and determines whether there is a vehicle network intrusion based on the residual and an intrusion detection notification device that provides a notification to a user, when the vehicle network intrusion is detected.

In an embodiment, the intrusion detection notification device may notify the user of the vehicle network intrusion via at least one of a visual notification, an audible notification, or a tactile notification.

In an embodiment, the vehicle network intrusion detection device may calculate the residual based on a message receive time interval and an average time interval in a normal state. In particular, the message receive time interval is a difference between a receive timestamp of a CAN message which is received immediately before and a receive timestamp of a CAN message which is currently received.

In an embodiment, the vehicle network intrusion detection device may calculate a cumulative residual by accumulating and updating a residual calculated for each CAN ID.

In an embodiment, the vehicle network intrusion detection device may calculate a differentiated cumulative residual by differentiating the cumulative residual when there are one or more of received CAN messages.

In an embodiment, the vehicle network intrusion detection device may calculate an upper threshold and a lower threshold based on an average value and a standard deviation of differentiated cumulative residuals calculated in a normal state.

In an embodiment, the vehicle network intrusion detection device may determine whether there is the vehicle network intrusion based on the cumulative residual or the differentiated cumulative residual.

According to another aspect of the present disclosure, a vehicle network intrusion detection method may include: recording, by a processor, a receive timestamp of a CAN message for each CAN ID; calculating, by the processor, a residual as a difference between a real receive timestamp and an average receive timestamp of the CAN message, based on the recorded receive timestamp; and determining, by the processor, whether there is a vehicle network intrusion based on the residual.

In another form, calculating the residual may include: calculating the residual based on a message receive time interval and an average time interval in a normal state. In particular, the message receive time interval is defined as a difference between a receive timestamp of a CAN message which is received immediately before and a receive timestamp of a CAN message which is currently received.

In an embodiment, the vehicle network intrusion detection method may further include calculating, by the processor, a cumulative residual by accumulating and updating a residual calculated for each CAN ID.

In an embodiment, the vehicle network intrusion detection method may further include calculating, by the processor, a differentiated cumulative residual by differentiating the cumulative residual when there are one or more of received CAN messages.

In an embodiment, determining whether there is the vehicle network intrusion may include: determining that the vehicle network intrusion is detected, when the cumulative residual or the differentiated cumulative residual departs from a predetermined threshold range.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The above and other objects, features and advantages of the present disclosure will be more apparent from the following detailed description taken in conjunction with the accompanying drawings.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some embodiments of the present disclosure will be described in detail with reference to the exemplary drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

An embodiment of the present disclosure discloses automotive intrusion detection system (IDS) technology for detecting a cyberattack which occurs on a CAN communication network and discloses technologies of measuring an amount of change in time interval error between packets, each of which has the same ID, and performing an intrusion detection function.

Hereinafter, a description will be given in detail of embodiments of the present disclosure with reference to FIGS. 1 and 9.

Figure 1:
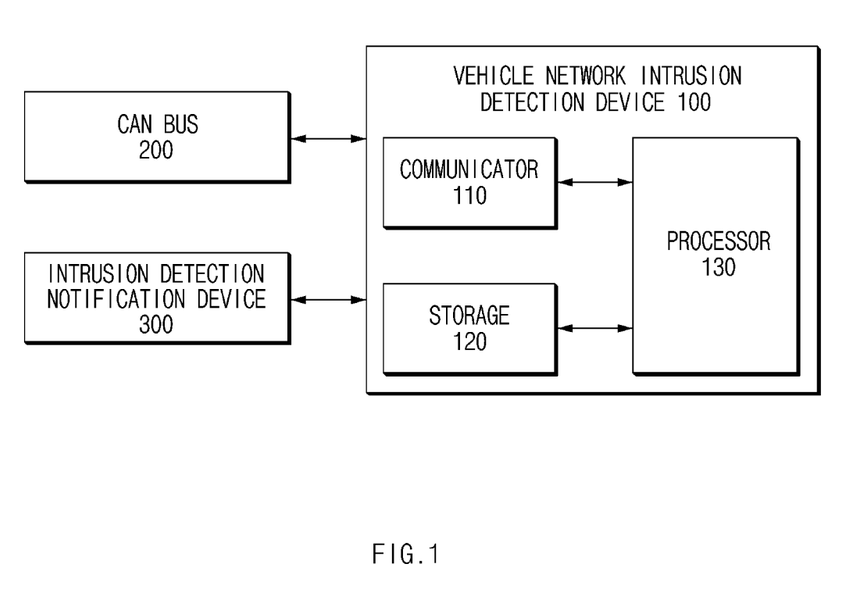
FIG. 1 is a block diagram illustrating a configuration of a vehicle system including a vehicle network intrusion detection device.
Figure 2:
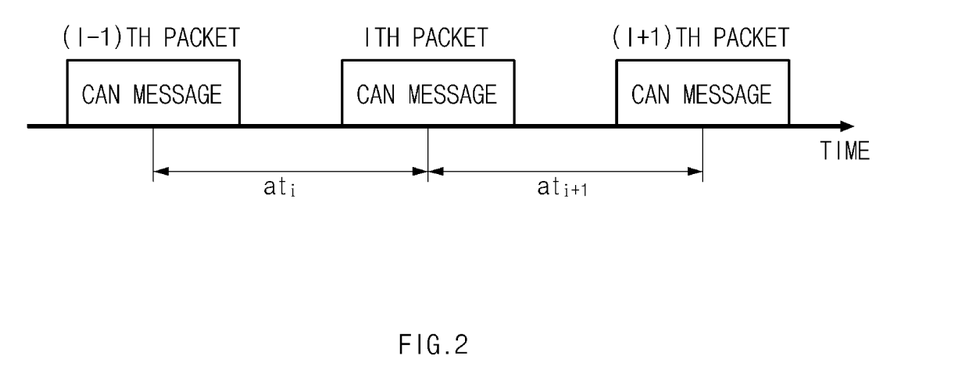
FIG. 2 is a drawing illustrating a message receive time interval for vehicle network intrusion detection.

FIG. 1 is a block diagram illustrating a configuration of a vehicle system including a vehicle network intrusion detection device according to an embodiment of the present disclosure. FIG. 2 is a drawing illustrating a message receive time interval for vehicle network intrusion detection according to an embodiment of the present disclosure.

Referring to FIG. 1, the vehicle system may include a vehicle network intrusion detection device 100 connected to a CAN bus 200 and an intrusion detection notification device 300.

The vehicle network intrusion detection device 100 may receive CAN messages via the CAN bus 200 and may record a receive timestamp of each of the received messages. When a CAN ID to be monitored is received, the vehicle network intrusion detection device 100 may record a message receive timestamp corresponding to the CAN ID, may calculate a residual, which is a difference between a real receive timestamp and an average receive timestamp, using the recorded receive timestamp, and may add the newly calculated residual value to a residual accumulation value to update the residual accumulation value.

The vehicle network intrusion detection device 100 may update a residual accumulation value whenever a CAN ID to be monitored is received and may analyze residual accumulation to determine whether there occurs an intrusion into a CAN communication network due to a cyberattack.

The vehicle network intrusion detection device 100 may include a communicator 110, a storage 120, and a processor 130.

The communicator 110 may be a hardware device implemented with various electronic circuits for performing inter-vehicle communication through CAN communication, local interconnect network (LIN) communication, or the like.

When a CAN message is received by the processor 130, the storage 120 may store a receive timestamp of the CAN message, a residual, a cumulative residual, a differentiated cumulative residual, the CAN message, a result of detecting an intrusion, or the like. The storage 120 may include at leas one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, or an optical disk.

The processor 130 may be electrically connected with the communicator 110, the storage 120, or the like and may electrically control the respective components. The processor 130 may be an electrical circuit which executes instructions of software and may perform a variety of data processing and calculation described below.

The processor 130 may record a receive timestamp of a CAN message for each CAN ID, may calculate a residual, which is a difference between a real receive timestamp and an average receive timestamp of the CAN message, using the recorded receive timestamp, and may determine whether there is a vehicle network intrusion based on the calculated residual. Referring to FIG. 2, the processor 130 may calculate a residual using an average value of a receive time interval $at_i$ between an ith received CAN message and an (i−1)th received CAN message and a receive time interval calculated in a normal state.

The processor 130 may calculate a residual based on a message receive time interval, which is a difference between a receive timestamp of a CAN message which is immediately before and a receive timestamp of a CAN message which is currently received, and an average time interval in a normal state.

The processor 130 may accumulate and update a residual calculated for each CAN ID to calculate a cumulative residual. When there are one or more received CAN message, the processor 130 may differentiate the cumulative residual to calculate a differentiated cumulative residual.

The processor 130 may calculate an upper threshold and a lower threshold using an average value and a standard deviation of differentiated cumulative residuals calculated in the normal state.

When the cumulative residual or the differentiated cumulative residual is greater than the upper threshold or is less than the lower threshold, the processor 130 may determine that the vehicle network intrusion is detected.

The ith calculated residual $r_i$ may be calculated as Equation 1 below.

$$r_i = at_i - t \qquad \text{[Equation 1]}$$

Herein, $at_i$ refers to the time interval between the ith received CAN message and the (i−1)th received CAN message, and t refers to the average time interval calculated in the normal state (which is not the intrusion state). In other words, the average time interval refers to an average value of a message receive time interval measured in the normal state.

The kth cumulative residual may be calculated as Equation 2 below.

$$R_{cum}[k] = \sum_{i}^{k} r_i \qquad \text{[Equation 2]}$$

Thereafter, the vehicle network intrusion detection device 100 may differentiate a cumulative residual $R_{cum}[k]$ to calculate an amount of change in time of the cumulative residual like Equation 3 below.

$$\frac{dR_{acc}}{dt}[k] = R'_{acc}[k] \qquad \text{[Equation 3]}$$

Thus, the vehicle network intrusion detection device 100 may analyze the calculated differentiated cumulative residual $R'_{acc}[k]$ and may perform an intrusion detection function.

$$thr_U = \mu + K \times \sigma$$

$$thr_L = \mu - K \times \sigma \qquad \text{[Equation 4]}$$

Herein, μ refers to the average of the differentiated cumulative residual $R'_{acc}$ calculated in the normal state, σ refers to the standard deviation of the differentiated cumulative residual $R'_{acc}$ calculated in the normal state, $thr_U$ refers to the upper threshold, and $thr_L$ refers to the lower threshold.

The vehicle network intrusion detection device 100 may calculate an upper threshold and a lower threshold like Equation 4 above using the average and standard deviation of the differentiated cumulative residuals. When the differentiated cumulative residual departs from a range of the upper threshold and the lower threshold, the vehicle network intrusion detection device 100 may detect it as an intrusion.

As such, an embodiment of the present disclosure may calculate a differentiated cumulative residual of a CAN message, may detect an intrusion into a CAN communication network due to a cyberattack, and may detect the intrusion using a difference between a cumulative residual in the normal state and a cumulative residual when the intrusion occurs, thus more accurately detecting the intrusion.

When the intrusion is detected by the vehicle network intrusion detection device 100, the intrusion detection notification device 300 may notify a user of the intrusion detection. In this case, the notification may be performed using at least one of a visual notification, an audible notification, or a tactile notification.

Furthermore, the intrusion detection notification device 300 may be implemented as a head-up display (HUD), a cluster, an audio video navigation (AVN), or the like, rather than a separate hardware device. Furthermore, the intrusion detection notification device 300 may include at least one of a liquid crystal display (LCD) a thin film transistor-LCD (TFT-LCD), a light emitting diode (LED) display, an organic LED (OLED) display, an active matrix OLED (AMOLED) display, a flexible display, a bended display, or a three-dimensional (3D) display.

Figure 3:
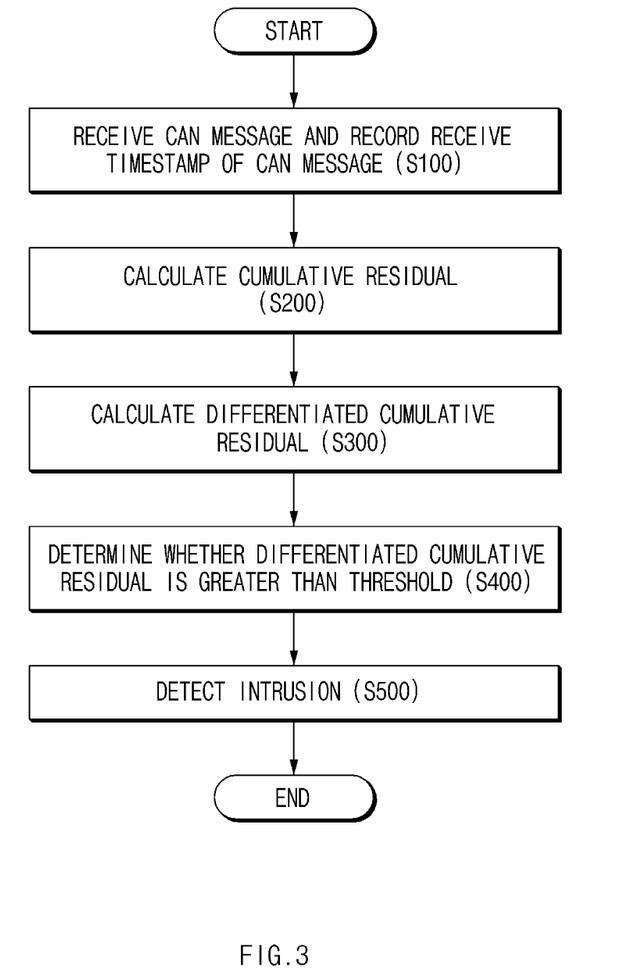
FIG. 3 is a flowchart illustrating a vehicle network intrusion detection method.

Hereinafter, referring to FIG. 3, a description will be given of a vehicle network intrusion detection method according to an embodiment of the present disclosure. FIG. 3 is a flowchart illustrating a vehicle network intrusion detection method according to an embodiment of the present disclosure.

Hereinafter, it is assumed that a vehicle network intrusion detection device 100 of FIG. 1 performs a process of FIG. 3. Furthermore, in a description of FIG. 3, an operation described as being performed by an apparatus may be understood as being controlled by a processor 130 of the vehicle network intrusion detection device 100.

Referring to FIG. 3, in S100, the apparatus may receive a CAN message and may record a receive timestamp of the CAN message. In this case, the apparatus may record the receive timestamps of all the received CAN messages for each CAN ID.

In S200, the apparatus may calculate a cumulative residual. The apparatus may add a residual calculated for each CAN ID to calculate the cumulative residual. The apparatus may calculate a residual for each CAN ID using an average value of a receive time interval between a CAN message which is received immediately before and a CAN message which is currently received and a message receive time interval calculated in a normal state (in a state where there is no network intrusion).

In S300, the apparatus may calculate a differentiated cumulative residual. The apparatus may differentiate the cumulative residual to calculate the differentiated cumulative residual.

In S400, the apparatus may determine whether the differentiated cumulative residual is greater than a threshold to determine whether there is a vehicle network intrusion.

In other words, when the differentiated cumulative residual is greater than the threshold, in S500, the apparatus may determine that an intrusion is detected. In this case, the threshold may be set to an upper threshold and a lower threshold. When the differentiated cumulative residual is included in a range of less than the upper threshold and greater than the lower threshold, the apparatus may determine a current state as the normal state. When the differentiated cumulative residual is included in a range of greater than the upper threshold and less than the lower threshold, the apparatus may determine the current state as an intrusion state.

Figure 4:
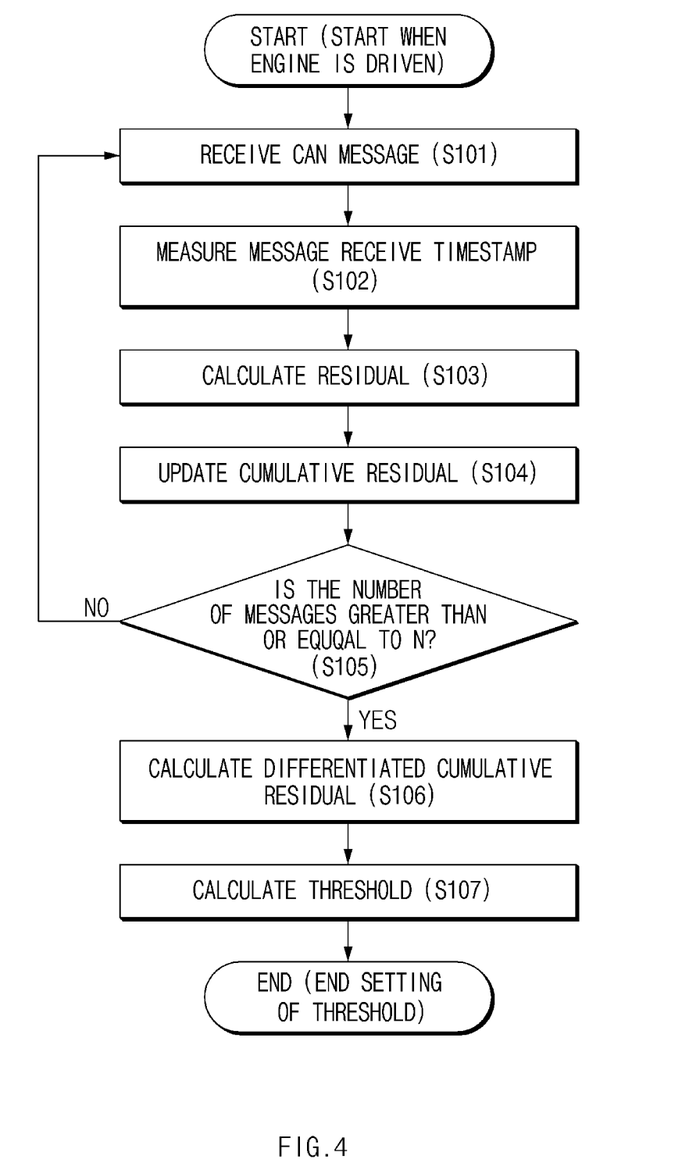
FIG. 4 is a flowchart illustrating a method for setting a threshold for vehicle network intrusion detection.

FIG. 4 is a flowchart illustrating a method for setting a threshold for vehicle network intrusion detection according to an embodiment of the present disclosure.

Hereinafter, it is assumed that a vehicle network intrusion detection device 100 of FIG. 1 performs a process of FIG. 4. Furthermore, in a description of FIG. 4, an operation described as being performed by an apparatus may be understood as being controlled by a processor 130 of the vehicle network intrusion detection device 100.

Referring to FIG. 4, after an engine starts to drive, when a CAN message is received in S101, in S102, the apparatus may record and store a message receive timestamp which is a timestamp when the CAN message is received. All of receive timestamps of CAN messages may be stored for each CAN ID.

In S103, the apparatus may calculate a receive time interval which is a difference between a receive timestamp of a CAN message which is received immediately before and a receive timestamp of a CAN message which is currently received and may calculate a residual based on the receive time interval.

In S104, the apparatus may accumulate a residual of a message for each CAN ID to calculate and store a cumulative residual. In S105, the apparatus may determine whether the number of the received messages is greater than or equal to N.

When the number of the received messages is less than N, the apparatus may return to S101 to repeatedly perform S101 to S105.

Meanwhile, when the number of the received messages is greater than or equal to N, in S106, the apparatus may differentiate the cumulative residual to calculate a differentiated cumulative residual.

In S107, the apparatus may calculate an upper threshold and a lower threshold based on an average value and a standard deviation of the differentiated cumulative residuals calculated in the normal state.

Figure 5:
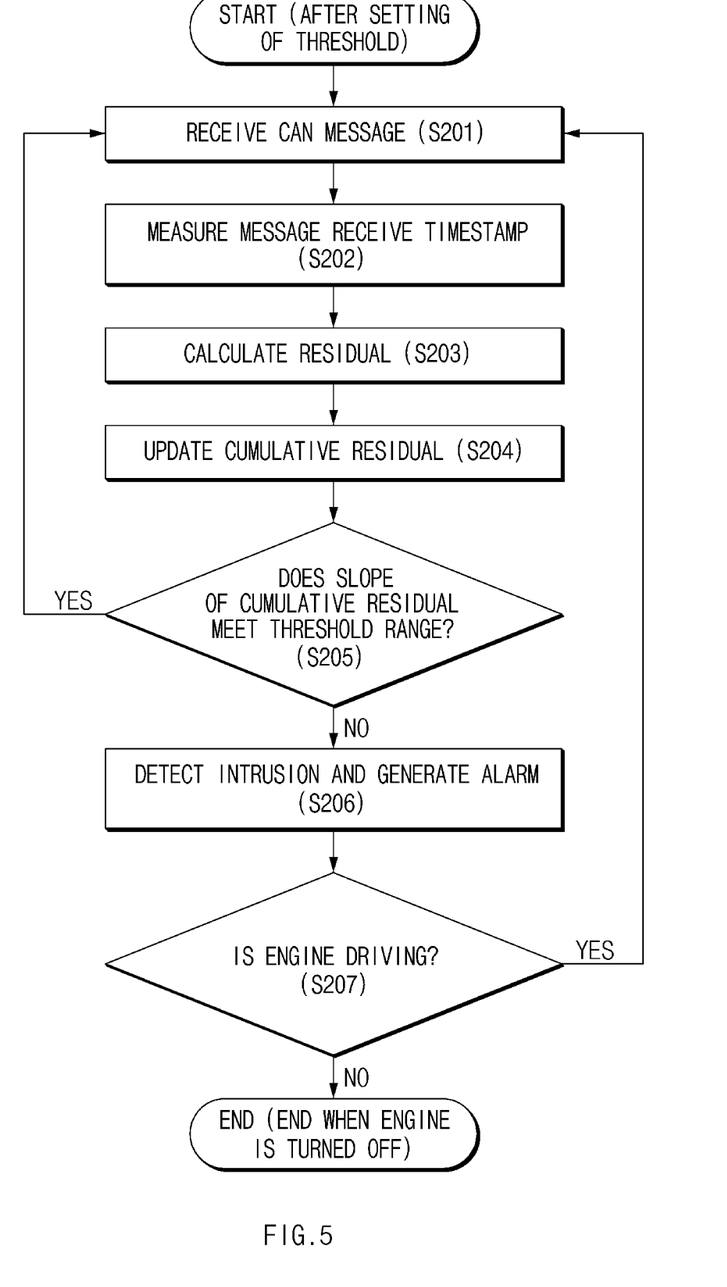
FIG. 5 is a flowchart illustrating a vehicle network intrusion detection method.

FIG. 5 is a flowchart illustrating a vehicle network intrusion detection method according to another embodiment of the present disclosure. In FIG. 5, an embodiment is exemplified as an intrusion is detected using a cumulative residual rather than a differentiated cumulative residual of FIG. 3.

Hereinafter, it is assumed that a vehicle network intrusion detection device 100 of FIG. 1 performs a process of FIG. 5. Furthermore, in a description of FIG. 5, an operation described as being performed by an apparatus may be understood as being controlled by a processor 130 of the vehicle network intrusion detection device 100. In this case, it is assumed that the process of FIG. 5 is in a state where setting of a threshold in FIG. 4 is completed.

Referring to FIG. 5, when a CAN message is received in S201, in S202, the apparatus may record and store a message receive timestamp. In S203, the apparatus may calculate a residual based on the message receive timestamp.

In S204, the apparatus may accumulate a residual for each CAN ID to calculate an cumulative residual. In S205, the apparatus may determine whether a slope of the cumulative residual meets a threshold range.

When the slope of the cumulative residual meets the threshold range, the apparatus may determine a current state as a normal state to return to S201 and repeatedly perform S201 to S205.

When the slope of the cumulative residual does not meet the threshold range, in S206, the apparatus may determine that an intrusion is detected and may generate an intrusion detection alarm.

In S207, the apparatus may determine whether an engine is driving. When the engine is driving, the apparatus may repeatedly perform S201 to S206 to continue performing vehicle network intrusion detection. When the driving of the engine is ended, the apparatus may end the vehicle network intrusion detection.

Figure 6A:
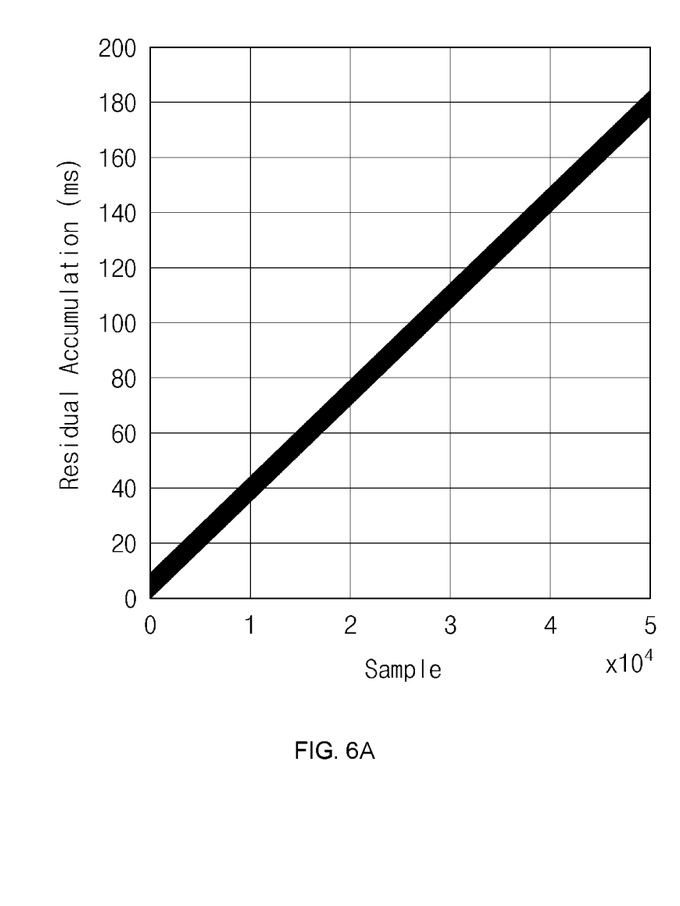
FIGS. 6A and 6B are graphs respectively illustrating a cumulative residual and a differentiated cumulative residual in a normal situation where there is no vehicle network intrusion.
Figure 6B:
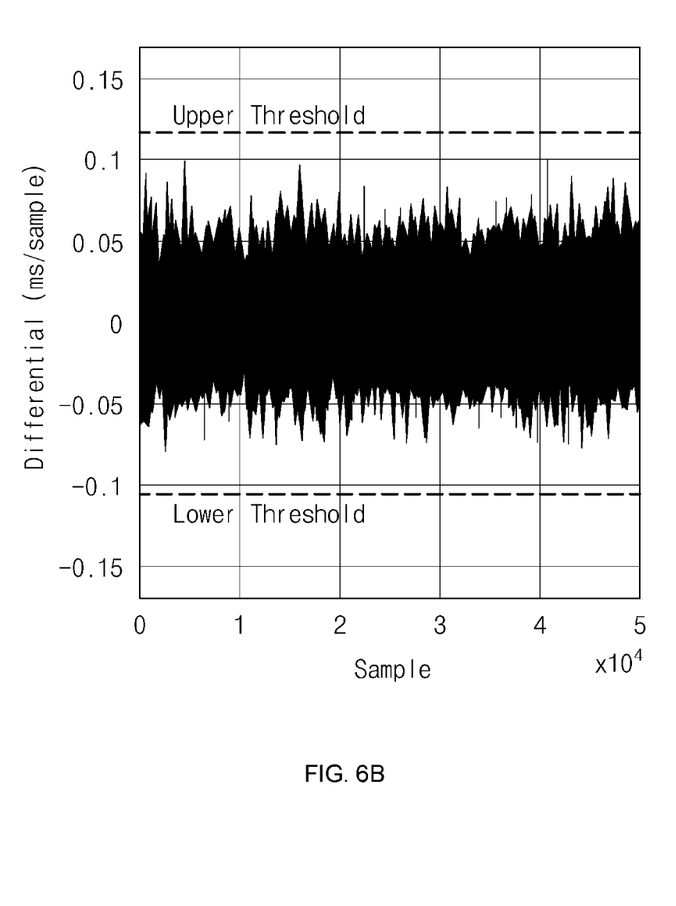

FIGS. 6A and 6B are graphs illustrating changes in cumulative residual and differentiated cumulative residual in a normal situation where there is no vehicle network intrusion according to an embodiment of the present disclosure.

FIG. 6A illustrates a graph indicating a cumulative residual for each CAN ID in a normal state of a vehicle network. FIG. 6B illustrates a graph indicating a differentiated cumulative residual for each CAN ID in the normal state of the vehicle network. In this case, FIG. 6B shows that the distribution of the differentiated cumulative residual is included in a range between an upper threshold and a lower threshold.

Figure 7A:
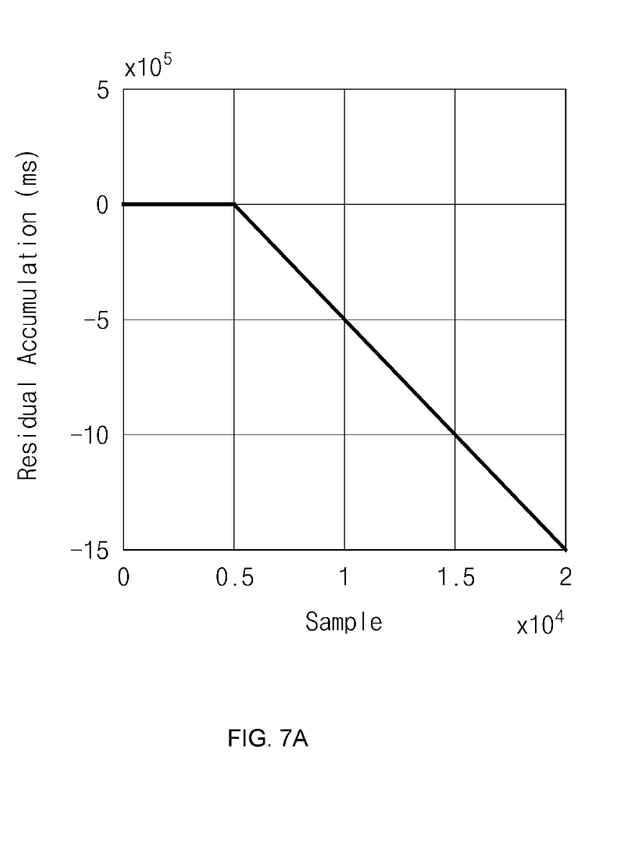
FIGS. 7A and 7B are graphs respectively illustrating a cumulative residual and a differentiated cumulative residual upon a message injection attack of a vehicle network.
Figure 7B:
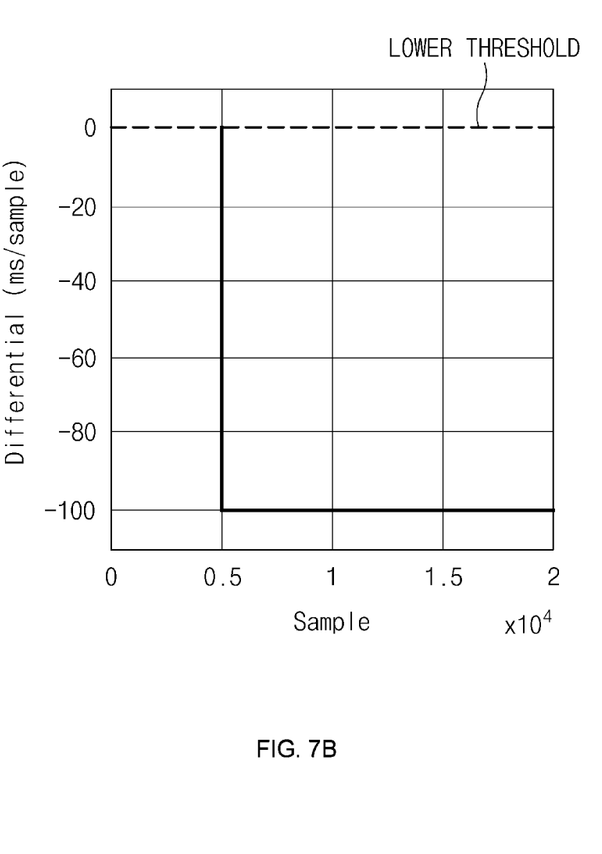

FIGS. 7A and 7B are graphs illustrating changes in cumulative residual and differentiated cumulative residual upon a message injection attack of a vehicle network according to an embodiment of the present disclosure.

Referring to FIG. 7A, the graph illustrates a cumulative residual for each CAN ID in a message injection attack situation of a vehicle network. In FIG. 7B, the graph illustrates a differentiated cumulative residual for each CAN ID in the message injection attack situation of the vehicle network. In FIG. 7B, it may be seen that the differentiated cumulative residual for each CAN ID is less than or equal to a lower threshold.

Figure 8A:
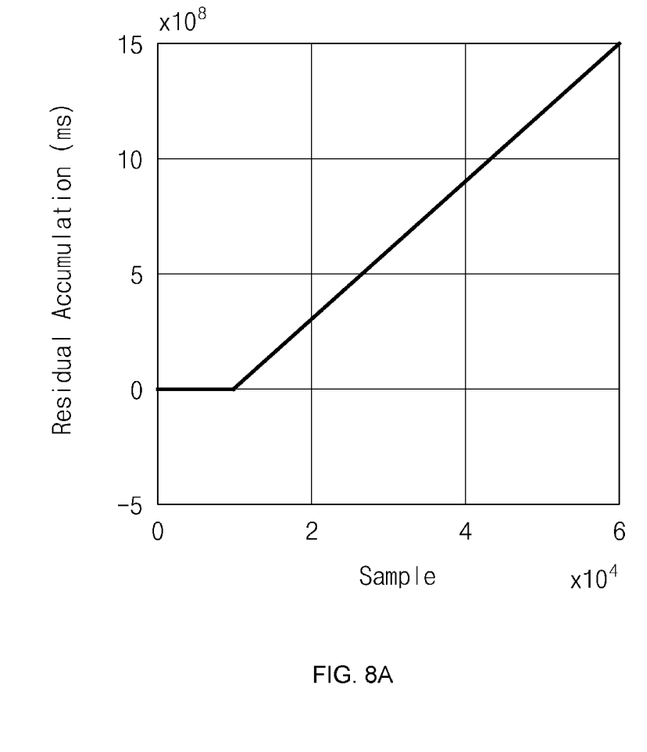
FIGS. 8A and 8B are graphs respectively illustrating a cumulative residual and a differentiated cumulative residual upon a suspension attack of a vehicle network.
Figure 8B:
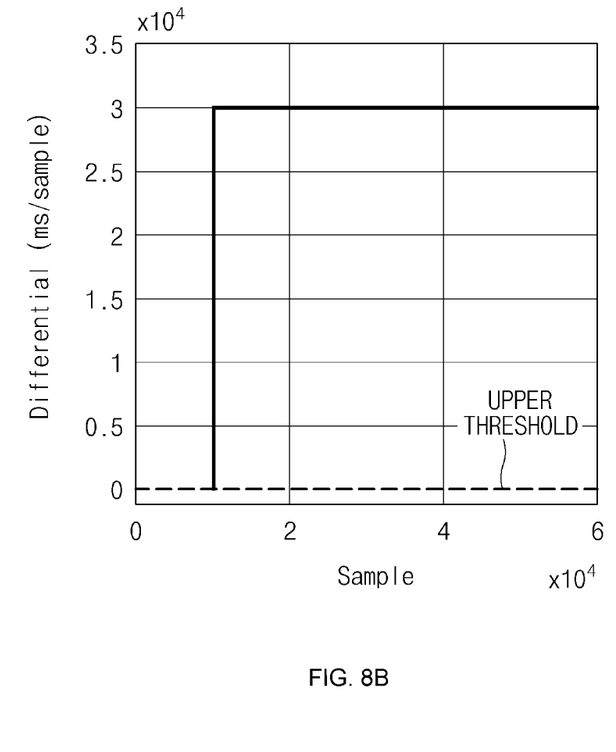

FIGS. 8A and 8B are graphs illustrating changes in cumulative residual and differentiated cumulative residual upon a suspension attack of a vehicle network according to an embodiment of the present disclosure.

The graph in FIG. 8A shows a cumulative residual for each CAN ID in a suspension attack situation of a vehicle network. The graph in FIG. 8B illustrates a differentiated cumulative residual for each CAN ID in the suspension attack situation of the vehicle network. The FIG. 8B shows that the differentiated cumulative residual for each CAN ID is greater than or equal to an upper threshold.

Existing intrusion detection system (IDS) technologies have an uppermost limit incapable of effectively detecting an attack type which copies a message period, but an embodiment of the present disclosure may effectively detect all types of attacks introduced until now.

Furthermore, existing technologies have a constraint in which a predetermined number or more of packets should be collected to detect whether there is an attack, but an embodiment of the present disclosure may detect whether there is an attack using only a single packet to reduce a difference (an attack detection time) between a time when a real attack occurs and a time when the attack is detected.

Furthermore, existing IDS technologies proposed until now should use a high-performance device because a computation overhead is high as a low-performance device is actually used, but it is advantageous for an embodiment of the present disclosure to save costs because a computation overhead for determining whether there is an intrusion is very low.

Moreover, an embodiment of the present disclosure may be an automotive IDS technology implementable at a low cost without modifying a system of an existing commercial vehicle to be loaded into a real vehicle through commercialization.

Furthermore, because an embodiment of the present disclosure is a technology which is robust to a change in external environment, it may be a technology more suitable for an actual vehicle environment than the intrusion detection technology which uses physical characteristics of an existing electronic control unit (ECU).

In addition, an existing technology needs a training process for monitoring CAN traffic during a certain time in each vehicle when implemented in the real vehicle, but an embodiment of the present disclosure may be very effective in terms of scalability because it is able for a vehicle having the same CAN communication network configuration to share the same training parameter.

Figure 9:
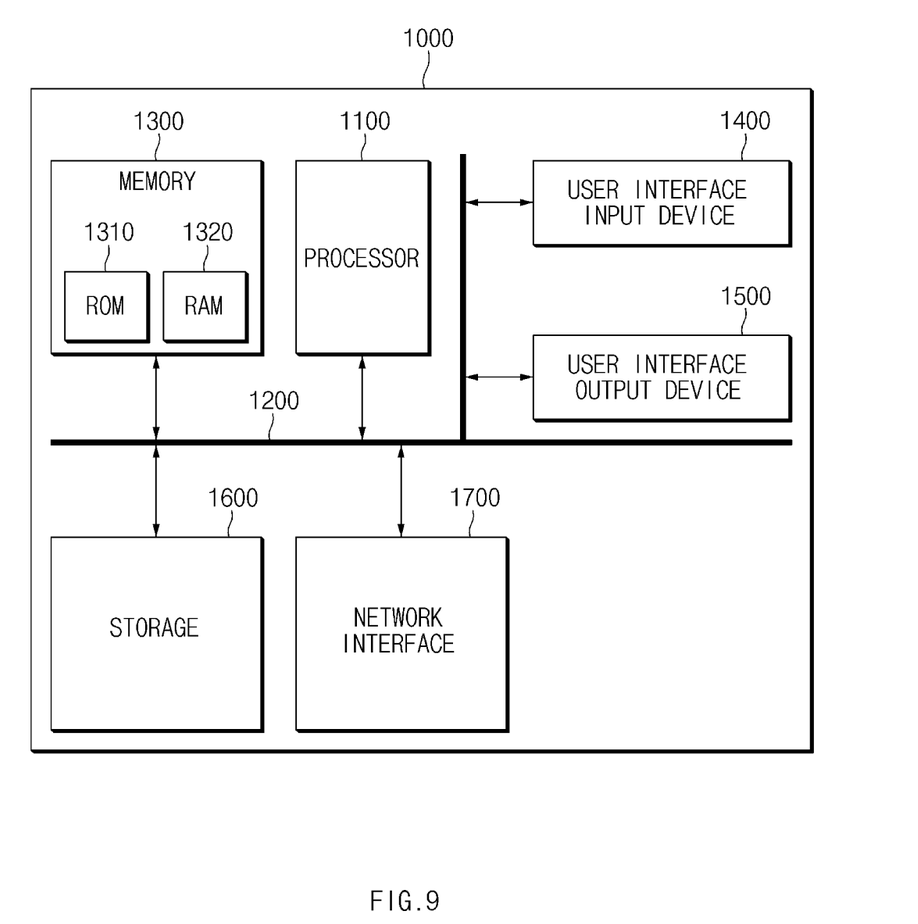
FIG. 9 is a block diagram illustrating a computing system.

FIG. 9 is a block diagram illustrating a computing system according to an embodiment of the present disclosure.

Referring to FIG. 9, a computing system 1000 may include at least one processor 1100, a memory 1300, a user interface input device 1400, a user interface output device 1500, storage 1600, or a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM memory, a flash memory, a ROM memory, an EPROM memory, an EEPROM memory, a register, a hard disk, a removable disk, and a CD-ROM.

The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

The present technology may effectively detect an intrusion into a CAN communication network of a vehicle by only updating software of a device in the vehicle.

In addition, various effects directly or indirectly ascertained through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A vehicle network intrusion detection device, comprising:
  a processor configured to:
    record a receive timestamp of a controller area network (CAN) message for each CAN ID,
    calculate a residual, which is a difference between a real receive timestamp and an average receive timestamp of the CAN message, using the recorded receive timestamp, and
    determine whether there is a vehicle network intrusion based on the residual; and
  a storage configured to store at least one of the CAN message receive timestamp, the residual, or a result of detecting the vehicle network intrusion, which are obtained by the processor.

2. The vehicle network intrusion detection device of claim 1, wherein the processor is configured to calculate the residual based on a message receive time interval and an average time interval in a normal state, and wherein the message receive time interval is defined as a difference between a receive timestamp of a CAN message which is received immediately before and a receive timestamp of a CAN message which is currently received.

3. The vehicle network intrusion detection device of claim 1, wherein the processor is configured to calculate a cumulative residual by accumulating and updating a residual calculated for each CAN ID.

4. The vehicle network intrusion detection device of claim 3, wherein the processor is configured to calculate a differentiated cumulative residual by differentiating the cumulative residual when there are one or more of received CAN messages.

5. The vehicle network intrusion detection device of claim 4, wherein the processor is configured to calculate an upper threshold and a lower threshold based on an average value and a standard deviation of differentiated cumulative residuals calculated in a normal state.

6. The vehicle network intrusion detection device of claim 5, wherein the processor is configured to determine that the vehicle network intrusion is detected, when the differentiated cumulative residual is greater than the upper threshold or is less than the lower threshold.

7. The vehicle network intrusion detection device of claim 1, wherein the processor is configured to determine that the vehicle network intrusion is detected, when the residual departs from a threshold range.

8. The vehicle network intrusion detection device of claim 1, further comprising:
a communicator configured to receive or transmit a CAN message through a CAN bus.

9. A vehicle system, comprising:
a vehicle network intrusion detection device configured to:
record a receive timestamp of a CAN message for each CAN ID,
calculate a residual, which is a difference between a real receive timestamp and an average receive timestamp of the CAN message, using the recorded receive timestamp, and
determine whether there is a vehicle network intrusion based on the residual; and
an intrusion detection notification device configured to provide a notification to a user, when the vehicle network intrusion is detected.

10. The vehicle system of claim 9, wherein the intrusion detection notification device is configured to notify the user of the vehicle network intrusion via at least one of a visual notification, an audible notification, or a tactile notification.

11. The vehicle system of claim 9, wherein the vehicle network intrusion detection device is configured to calculate the residual based on a message receive time interval, and an average time interval in a normal state, and
wherein the message receive time interval is a difference between a receive timestamp of a CAN message which is received immediately before and a receive timestamp of a CAN message which is currently received.

12. The vehicle system of claim 9, wherein the vehicle network intrusion detection device is configured to calculate a cumulative residual by accumulating and updating a residual calculated for each CAN ID.

13. The vehicle system of claim 12, wherein the vehicle network intrusion detection device is configured to calculate a differentiated cumulative residual by differentiating the cumulative residual when there are one or more of received CAN messages.

14. The vehicle system of claim 13, wherein the vehicle network intrusion detection device is configured to calculate an upper threshold and a lower threshold based on an average value and a standard deviation of differentiated cumulative residuals calculated in a normal state.

15. The vehicle system of claim 13, wherein the vehicle network intrusion detection device is configured to determine whether there is the vehicle network intrusion based on the cumulative residual or the differentiated cumulative residual.

16. A vehicle network intrusion detection method, comprising:
recording, by a processor, a receive timestamp of a CAN message for each CAN ID;
calculating, by the processor, a residual defined as a difference between a real receive timestamp and an average receive timestamp of the CAN message, based on the recorded receive timestamp; and
determining, by the processor, whether there is a vehicle network intrusion based on the residual.

17. The vehicle network intrusion detection method of claim 16, wherein calculating the residual includes:
calculating the residual based on a message receive time interval, and an average time interval in a normal state, and
wherein the message receive time interval is defined as a difference between a receive timestamp of a CAN message which is received immediately before and a receive timestamp of a CAN message which is currently received.

18. The vehicle network intrusion detection method of claim 16, further comprising:
calculating, by the processor, a cumulative residual by accumulating and updating a residual calculated for each CAN ID.

19. The vehicle network intrusion detection method of claim 18, further comprising:
calculating, by the processor, a differentiated cumulative residual by differentiating the cumulative residual when there are one or more of received CAN messages.

20. The vehicle network intrusion detection method of claim 19, wherein determining whether there is the vehicle network intrusion includes:
determining that the vehicle network intrusion is detected, when the cumulative residual or the differentiated cumulative residual departs from a predetermined threshold range.

* * * * *